3,553,310
IMMUNOLOGICALLY REACTIVE PARTICLES

Louis L. Csizmas, Virendra Patel, and Raymond Vincent Davis, Elkhart, Ind., assignors to Miles Laboratories, Inc., Elkhart, Ind., a corporation of Indiana
No Drawing. Filed Dec. 28, 1967, Ser. No. 694,059
Int. Cl. A61k 9/00, 27/00
U.S. Cl. 424—2     6 Claims

ABSTRACT OF THE DISCLOSURE

Insoluble reactive particles are formed and then directly chemically coupled with biological materials to form useful particles. The reactive particles are formed by attaching to the surfaces of discrete carried particles compounds which stabilize the particles and which form aldehyde active moieties on said surfaces. The useful compounds for this purpose are alpha, beta-unsaturated aldehydes and dialdehydes. Immunological testing can be carried out with the indicator particles of this invention when immunological materials are coupled to the carrier particles.

BACKGROUND OF THE INVENTION

This invention relates to stabilized aldehyde reactive particles which can be used to form insolubilized biological reagent particles. More particularly, it relates to reactive particles having aldehyde active moieties on the surfaces thereof which can be reacted with an immunological material to form indicator particles with which immunological tests can be performed.

Various particles to which biological materials can be at least temporarily attached and which are preserved and thus stabilized against deterioration have been used in the past. Typical of the early particles used were formalinized red blood cells treated with tannic acid, and in one use thereof a biological material having immunological properties was physically adsorbed on the particles in order to form an indicator particle. These particles did not permit chemical coupling with the immunological materials and thus such materials were found to leach from the surfaces of the particles, causing false results in the testing conducted with such particles.

Other particles which have been used in the past included red blood cells which were treated with formaldehyde in order to stabilize them against lysis and were then treated with a chemical coupling agent such as bis-diazobenzidine. Such particles can then be chemically reacted with immunological materials by coupling through the bis-diazobenzidine. The coupling agent bis-diazobenzidine is difficult to prepare and store since it is highly reactive and the coupling agent and the immunological material to be coupled must be added nearly simultaneously to the carrier particle. Thus, reactive particles capable of coupling with the immunological material prepared in this manner do not have a usable independent existence and, therefore, cannot be stored for later coupling with selected immunological materials. Also the reaction technique employed involves a first step of stabilizing the red blood cell and then a second step of coupling to form the reactive particles, both of which steps must be carefully carried out by skilled laboratory personnel in order to produce workable immunological indicator systems.

Ling, N. R.: J. Haematology, 1961, 7, pp. 299–302, reported that red blood cells were mixed with several aldehydes and then an attempt was made to attach serum proteins thereto. The degree of attachment was reported to be too erratic to be useful as a technique for attaching proteins to cells. No aldehyde active moieties were identified on the cell surfaces. The glutaraldehyde used for cell treatment should have been theoretically capable of forming aldehyde active moieties on the surfaces of the cells, but in fact this not was realized, possibly due to the use of glutaraldehyde as an equivalent of formaldehyde, pyruvic aldehyde and other monoaldehydes. The red blood cells after being mixed with the aldehydes were allowed to remain in contact with the proteins only a short time during which they could not react with any aldehyde groups which may have been present. Also the serum proteins were contacted with the thus treated red blood cells at 50° C., at which temperature the proteins can conglomerate on the cells' surfaces in the absence of any coupling reaction. Thus no reactivity for the surfaces of the treated cells was found to be present or could have been shown by the experimental design used. This is shown by the choice of pyruvic aldehyde for a preferred preservative, it being now known that this aldehyde is not able to form aldehyde reactive red blood cells.

It has now been discovered that stabilized and preserved reactive particles can be formed by reacting certain aldehydes with carrier particles. These reactive particles can then be used to form insolubilized reagents by coupling them directly to biological materials.

It is, therefore, an object of this invention to provide reactive particles which are stabilized and preserved against lysis and which are capable of being coupled to biological materials.

Another object is to provide a process for making said reactive particles.

Yet another object is to provide biological reagents which are formed by coupling the above reactive particles to various biological materials.

Yet another object of this invention is to provide a process for making said biological reagents.

SUMMARY OF THE INVENTION

Carrier particles having proteinaceous surfaces such as microbial cells, red blood cells, or proteinaceous surfaced polymeric particles are reacted with a compound selected from the group of an alpha, beta-unsaturated aldehyde, a dialdehyde or mixtures thereof to form aldehyde reactive particles which are preserved and stabilized against lysis. These reactive particles may be stored in a dry, anhydrous state or in a wet condition and coupled to various biological materials to form specific reagents as desired.

The alpha, beta-unsaturated aldehyde may be any compound having a formula of the type:

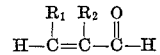

wherein any one of $R_1$ or $R_2$ can be hydrogen or a methyl group. Representative of this aldehyde are: acrolein, methacrolein, and 2-butenal (crotonaldehyde). Of these acrolein is preferred.

The dialdehyde can be aliphatic such as glutaraldehyde which has two carbonyl groups, and generally it can be any aliphatic dialdehyde having at least one methylene group separating the carbonyl groups. Thus propanedial (malonaldehyde) and butanedial (succinaldehyde) can also be employed.

When one of these aldehyde compounds is reacted with the surfaces of carrier particles two effects are produced. The first is that the surfaces are stabilized against rupture (lysis of cells) and the second is that aldehyde active moieties are affixed to the surfaces. These moieties are believed to be carbonyl groups of aldehydic form and as such are highly reactive to the amine groups of biological materials since they form covalent bonds between the carrier particles and the biological materials.

The preservation of the carrier particles by the above aldehyde compounds occurs rapidly at room temperatures (20° C.–25° C.) upon mixing thereof. However, at least 16 hours is needed to permit the development of satisfactory aldehyde activity on the particle surfaces. The subsequent coupling of the biological materials therewith occurs slowly at room temperatures and thus coupling times of at least 48 hours are desirable, and preferably 5 to 7 days. The resulting insolubilized biological reagents can be employed directly to test for an immunological material when the substance coupled to the carrier particles is the immunological counterpart thereto or they can be dried for storage and later reconstituted for employment as test vehicles. The drying step is generally carried out by means of lyophilization procedure.

The term "immunological counterpart" as used above denotes either an antigen or an antibody which reacts specifically with the corresponding antibody or antigen, and the term "biological material" as used herein describes substances of biological origin such an antigens, antibodies, enzymes as well has haptenes, all of which are capable of chemically reacting with aldehyde groups.

Since the aldehyde moities react only slowly with biological materials it is not necessary to block the unreacted of these moieties before such testing because the immunological material being tested for is not capable of attaching to the reactive particle during the time required to perform the test.

The reagents can also be used as immuno-absorbents when the coupled biological material has immunological properties. Such reagents absorb from fluid media the immunlogical material which binds through immunospecificity to the material coupled to the stabilized carrier particle. The reagents can be employed as enzymatic conversion agents when enzymes are coupled to the reactive particles.

Another utility provided by these carrier particles which are cellular is that since the aldehyde treatment preserves the cells without causing the activity of all of the natural antigenic groups to be altered, these reactive particles can be used directly as indicator particles. For example, the M-antigen of sheep, horse, and beef red blood cells, the Forssman antigen of sheep red blood cells, and the A,B and AB antigens of human red blood cells can all be preserved on their cells and used in testing for their immunological counterparts. Also many of the microbial cells can be used directly to test for the presence of their antibodies in test samples. Selected goat red blood cells have the property that they are not agglutinated by human sera which makes them ideal inert carrier particles and even after aldehyde treatment this property remains.

Another advantage of the present invention is that the aldehyde treated cells can be stored for prolonged periods without danger of microbial contamination where minimum sterility precautions are taken during the latter stages of the treatment.

The biological reagents of this invention when used for immunological indicator particles are prepared by reacting a specific antigenic or antibody material with the reactive particles. When the immunological counterpart to the material coupled to the reactive particles is to be detected directly by use of the immunological indicator particles the testing is referred to as agglutination testing and is carried out by mixing the indicator particles with a sample of the fluid suspected of containing the immunological counterpart and observing the resulting agglutination or nonagglutination pattern. The occurrence of agglutination denotes the presence of the material tested for while the absence of agglutination denotes the absence of suspected material. Agglutination testing may be carried out by coupling either the antigen or the antibody to the reactive particles of this invention and then directly testing for the presence of the immunological counterpart in the sample fluid.

Most antibody containing fluids when directly coupled to the reactive particles of this invention maintain their antibody properties and can therefore be used for detecting their corresponding antigens.

The same indicator particles can be used for inhibition of agglutination testing by adding to the test medium in an unbound form a material having a reactive site similar to the immunological material attached to the reactive particles. For example, when testing for an antibody a quantity of the antigen thereto can be added in an unbound state to the testing medium prior to or along with the indicator particles consisting of the reactive particles coupled to the antigen. If the sample fluid contains the antibody, this antibody will react with the unbound antigen in the testing medium and will thus be unable to agglutinate with the indicator system, hence the agglutination which would otherwise occur is inhibited. Such inhibition of agglutination testing can be carried out with the appropriate indicator particles to detect the presence of either antibody or antigen in sample fluids. Thus either an antigen or its antibody can be detected with the indicator particles of this invention.

The microbial cells useful as carrier particles in this invention can be any self-reproducing micro-organism which is propagated with or without dependence upon other organisms. Both gram positive and gram negative bacterial cells can be used. Fungal cells and protozoological cells can likewise be employed, as can viral particles. These are generally unicellular organisms which are occasionally joined in clumps or aggregates. The cells may be used in this form provided their aggregate size does not form a carrier particle which is so large that the test system formed with it will not agglutinate in the presence of a substance which is an immunological counterpart to the antigenic substance bound to the aggregated cells. Generally, the preferred microbial cells are bacterial cells or aggregates thereof which are of uniform shape and size and have maximum external dimensions in one direction of from about 0.2 to 10 microns. While not preferred, a mixture of different but uniform cells may be used. For these bacteria the usable microbial cells include those in Division I of the Vegetable Kingdom includin Classes I, II, and III, Order I. Class III, Order I microbial cells include the intracellular viral particles which have dimensions of about 0.2 micron.

Reference may be had to Bergey's Manual of Determinative Bacteriology by R. S. Breed, E. G. D. Murray, N. R. Smith, 7th edition, 1947, the Williams and Wilkins Company, for a complete listing of usable bacterial cells. Particularly useful are the bacteria of Class II, Suborder II, Family IV (Pseudomonadaceae) and Class II, Order IV, Family IV (Enterobacteriaceae). All Tribes I–V are considered to represent preferred microbial cells for purpose of this invention. Also Class II, Order IV, Families V (Brucelleae), X (Lactobacilleae) and XIII (Bacillaceae) are considered preferred. Both Orders I and II of Class III organisms can be employed where smaller particle sizes of about 0.2 micron or under are desired. Particularly, the Order II Virales are of small dimension which limits their usefulness.

*Escherichia coli* is a specially preferred bacterial cell for purposes of this invention. Another specially preferred microbial cell is the commonly available yeast, *Saccharomyces cerevisiae*. The yeast growth phases of the fungal cells are also preferred for use as carrier particles.

Each of the aldehyde compounds acts as a preservative agent to stabilize and preserve the cells against lysis and in so doing they render the microbial cells nonreproducing.

If desired, the microbial cells or other carrier particles can be stained in order to improve the visual distinction of the indicator particles from the surrounding background. An ordinary stain such as hematoxylin, fuchsin, and crystal violet can be used for this purpose. Another optimal preparation treatment for microbial cells is to wash them with an organic solvent such as alcohols, ethers, etc. to remove any polysaccharide or wax layers which may be present and might interfere with the reaction between the microbial cells and the aldehyde compounds.

The red blood cell carrier particles can be any of those recovered from a wide range of animals. Examples of red blood cells successfully employed are those obtained from the following animals: opossum, rat, rabbit, guinea pig, human, goat, horse, sheep, chicken, alligator and turtle. The manner of collection of the red blood cells is to extract a blood sample from the animal and to then separate the red blood cells from the serum by centrifugation. The red blood cells are then recovered and stored in physiological saline solution prior to treatment with the aldehyde compound.

The proteinaceous surfaced polymeric particles can be formed by coating insoluble particles having a size range of about from 0.1 to 10 microns with gelatin, a proteinaceous material, by a technique such as coacervation coating or encapsulation. For example, particles of polystyrene such as set out in U.S. Pat. 3,234,096 to Pollack can be encapsulated by emulsifying them in a gelatin solution and then spray-drying the emulsion. Only a thin film of gelatin need be deposited on the surfaces of the particles so that the aldehyde compounds can be reacted with said particles. Also particles made from gelatin together with a cross-linking agent such as a solubilized polyacrolein can be used.

The aldehyde compounds need only be relatively pure materials in order to assure their successful use. One manner of assuring purity is to distill the compound under nitrogen to assure its presence in a monomeric form. Generally, the reaction of the aldehyde compound with the carrier particles can be conducted in saline solutions of lower than physiological concentration due to the osmolarity imparted by the aldehyde. The coupling of the thus formed reactive particles to biological materials can likewise be carried out in saline solution. However, since the reactive particles are stabilized against lysis, any solution compatible with the biological material being reacted therewith is usable as a reaction medium.

Many different biological materials can be coupled to the reactive particles. The following are exemplary of many of these different materials having immunological properties which can be used to form immunological indicator particles according to the present invention:

Human serum albumin, bovine serum albumin (BSA) and its antibody derived from rabbit; ovalbumin; human chlorionic gonadotropin (HCG); blood group A and B antigens; gamma globulins; beta globulins; beta-lipoprotein; alpha-globulins of the human plasma fraction; anti-C-reactive protein derived from either the goat or the sheep; diphtheria antitoxin; tetanus antitoxin; human transferrin; trichinella antigen; thyroglobulin and similar antigenic materials of either pathogenic or natural organisms; myoglobin, hemoglobin, leutinizing hormone, and insulin.

Since antibodies are gamma globulin molecules modified in such a way that they have antigenic receptor sites for the antigen to which they are immunological counterparts, the presence of antibodies can be indicated by their reaction with either their respective antigen or the antibody to the gamma globulin from which they were formed.

The antigenic immunological materials referred to herein indicate materials which, when introduced into the circulatory system of an animal produce antibodies specific to that particular antigenic material. Such antigenic materials include serum proteins such as gamma globulin and serum albumin or blood grouping substances "A" and "B" from which tests for blood typing can be made as well as the other antigens listed above.

Microbial antigens can be coupled to the reactive particle in order to make indicator systems for detecting antibodies thereto in body fluids. Antigenic hormone substances present in the fluid system of organisms may also be coupled to the reactive particles. Also enzymes may be used as antigenic substances. The microbial antigens for antibodies can be of bacterial, fungal, parasitological or viral origin and are generally stripped from the naturally occurring cells prior to use for coupling to the reactive particles of the present invention.

The biological material coupled to the supportive carrier particles can be an enzyme such as diastase, maltase, zymase, amylase, or other enzymes and/or co-enzymes. When an enzyme is coupled to a carrier particle it may be employed to carry out enzymatic conversion processes in a preferred fashion. Thus, the first three of the above-listed enzymes can be used in a three-stage process for the conversion of starch to alcohol, while the last enzyme listed can be used to convert starch slurries to sugar syrups. An advantage of employing the enzymes in an insolubilized form by coupling them to solid carrier particles according to the present invention is that the enzymes do not become commingled with the material being processed if the particles are retained in a fixed position or entrapped in a bed through which the material being converted can pass. As another example of an enzymatic conversion process "black-strap" molasses can be converted to alcohol by coupling both invertase and zymase to carrier particles and then passing the molasses thereover.

The primary requirement for the biological materials referred to herein is that they have at least one group which can react with an aldehyde group. Unreacted amino groups or groups in the protein chains of most biological materials provide such groups.

Blood group isoagglutinin substances and various disease states may be detected by the use of the immunological indicators provided. This detection is normally carried out by a slide agglutination method or a micro-titrator agglutination method. The former relies on mixing of the test reagents and the fluid sample on a flat glass surface and is generally done on only a qualitative basis in order to detect an expected concentration of the material being tested for. The slide agglutination and micro-titrator agglutination methods can be carried out either as an agglutination or an inhibition of agglutination test depending upon whether or not unbound immunological material of the same nature as that bound to the reactive particles is present in the test medium. An explanation of this technique for agglutination testing and for the inhibition of agglutination method is as follows:

The micro-titrator agglutination technique is carried out by placing the test reagents for each test in a series of wells formed in a row in the upper surface of a plastic or other suitable plate. The linear arrangement of the wells allows serial dilution of the antibody used for the agglutionation or inhibition testing. The serial dilution is carried out by first placing one drop of a diluent in each of the wells in the row and then adding a one drop volume of an initial antibody solution having an initial dilution of, for example, 1:5 to the first well using a loop or spiral calibrated to hold one drop of fluid. Next, the loop is submerged in the first well and one drop of fluid is withdrawn and is then mixed with the diluent in the second well. The dilution of the first well is then 1:10 and the dilution of the second well is 1:20. This process of serial dilution is repeated until all of the wells in the row have been treated, thus producing a series of antibody dilutions in each well differing by a factor of one-half from the earlier treated adjacent well.

For agglutination testing one drop of a suspension of the indicator particles is added directly to the wells following the preparation of the serial dilutions. If inhibitor of agglutination testing is to be conducted, a quantity of unbound antigen generally in excess of the amount of antibody is added to each well prior to the addition of the indicator system. When samples of body fluids are to be tested these are added as the antigen and generally the serial dilutions of the antibody are controlled so that the concentration of the antibody equivalent to the concentration of the antigen expected to be detected lies in the midportion of the serial dilutions. This procedure allows an identification of the titre of the antigen in the body fluid sample and hence a semi-quantitative determination.

The process for making the reactive particles involves mixing the carrier particles with the aldehyde compounds set out herein for a period sufficient to allow the reaction between the compounds and the surfaces of the carrier particles to occur. This reaction proceeds slowly at room temperatures (20° C.–25° C.) so that time periods of about 16 to 80 hours are necessary to complete the reaction. Generally, it is preferred to shake the materials on a laboratory shaker during part or all of this reaction period. If desired, a pretreatment with a preservative agent such as formaldehyde can be used, although this is not necessary since the aldehyde compounds of this invention also serve as preservative agents.

A preferred method of treatment of the red blood cells with the aldehyde compounds is exemplified by reference to the method involving treatment with glutaraldehyde. Blood is collected in an Alsever's solution, centrifuged and the red cells collected. The red cells are then resuspended to a 10% cell suspension in saline solution, and nitrogen gas is passed through the cell suspension for one to two hours. One volume of these treated cells can then be reacted with mild agitation at about 25° C. for 17 hours with two volumes of a 2% by volume solution of distilled glutaraldehyde in a pH 7.2 saline phosphate buffer (0.0075 M NaCl and 0.0075 M phosphate ion concentration). The glutaraldehyde is preferably vacuum distilled. After the reaction has been carried out the glutaraldehyde reactive cells are centrifuged, washed three times and resuspended in 0.85% saline to a 10% cells suspension and stored in sterile containers at 4° C. When acrolein is used, the preferred treatment with respect to glutaraldehyde is followed with the exceptions that a 5% cell suspension in 0.85% saline solution is reacted with a 4% by volume solution of freshly distilled acrolein in a pH 7.2 saline phosphate buffer (0.09 M NaCl and 0.0037 M phosphate ion concentration) and the washed cells are then stored at a 20% suspension. Since the pH in these treatments is not critical pH 6–8 can be safely used in most cases.

The exact manner of the reaction of each of the aldehyde compounds with the respective carrier particles is not completely known. It is believed that one of the carbonyl groups of the dialdehyde reacts directly with amino acid groups on the surfaces of the carrier particles leaving the remaining carbonyl group free for reaction with an immunological material when it is brought in contact with the treated carrier particle. Some limited polymerization of the dialdehyde may occur on the surface of the carrier particles so that several monomeric molecules are joined to provide a moiety having a polyaldehyde linkage. It is believed that in the case of the alpha, beta-unsaturated aldehydes a Michael-type nucleophilic addition reaction occurs between the amino groups of the carrier particle surfaces and the double bond of the aldehyde. Thereafter, some of the aldehyde groups react with the surfaces of the carrier particles and the remaining aldehyde groups are free for reaction with chemical groups in the biological materials added thereto. The presence of the free aldehyde groups can be demonstrated e.g. with Schiff's reagent even after the particles have been washed up to 30 times within a one week period before the Schiff reaction. An intense purple color is readily recognizable on the surface of particles under a microscope.

The process for making biological reagents by use of the thus produced reactive particles of the present invention is likewise easily accomplished. The prepared reactive particles are added to a fluid medium and the biological material to be coupled therewith is then added, after which the mixture is stored at room temperature for about 48 hours or more to allow the coupling reaction to occur. It is preferred to use agitation during part or all of this time period and in particular to use an elevated temperature of about 37° C. near the end of the coupling reaction period. Since the carrier particles are stabilized and preserved against lysis, it is not necessary to use a physiological saline solution for this reaction.

It can be seen from the above processes that the present invention offers many advantages over the use of the coupling procdures of the prior art. The reacative particles are simply prepared and can be stored for extended periods of time prior to their use. This represents a significant advance in the art, due to the fact that the reactive particles can be prepared at one time and then used as needed in the formation of many different biological reagents.

DESCRIPTION OF THE PREFERRED EMBODIMENT

The microbial cells are used to provide the preferred carrier particles for slide agglutination testing and they are easily obtained by well known culturing techniques. The preferred reactive particles are formed by adding acrolein to the microbial cells and shaking at room temperature for a period of about 40 hours.

These preferred particles can then be coupled with any of a variety of biological materials by reaction therewith at room temperature for about 2 to 5 days and thereafter for about 2 hours at an elevated temperature of 37° C. The resulting indicator particles are particularly advantageous for conducting agglutination and inhibition of agglutination testing.

The preferred microbial cell due to its ease of culturing and nonpathogenic characteristics is E. coli.

Goat red blood cells are preferred as inert carrier particles for micro-titrator testing.

Acrolein is the preferred aldehyde for coupling, especially with antibodies, since it is found that when acrolein is used the resulting titres are higher than those produced when the other aldehydes are used.

These and other embodiments of the persent invention are further detailed in the following examples which are illustrative only and are not to be construed as limitative of the invention.

EXAMPLE I

Microbial cells were reacted with acrolein and glutaraldehyde to form reactive particles. These reactive particles were then reacted with biological materials to form reagents. *Escherichia coli* (*E. coli*) and *Saccharomyces cerevisiae* (yeast) were the microbial cells used and horse gamma-globulin and human chorionic gonadotropin (HCG) were the biological materials used.

Preparation of the reactive particles

A well growing culture of *E. coli* in brain-heart infusion broth was harvested by centrifugation after 4.5 hours growth at 37° C. and washed three times with a sterile saline solution. Sterile saline was then added to make a 1.5% suspension of the cells.

The pH of a quantity of a 50% aqueous solution of glutaraldehyde (commercial grade) was adjusted to pH 7 with NaOH solution. Next a 2% (w./v.) solution of the glutaraldehyde was made in a diluent containing 0.00375 M NaCl and 0.00375 M sodium phosphate adjusted to pH 7.2.

A 4.5% (w./v.) solution of distilled acrolein was made up to include in its final composition 0.10 M NaCl and 0.00375 M sodium phosphate buffer (pH 7.2). The acrolein used was commercially available compound distilled in a round-bottomed flask fitted with a thermometer, a Liebig condenser and an electrically heated mantle and filled with a nitrogen atmosphere. The distillation apparatus was covered with a black drape to exclude light, and the distillation was carried out at 52.5° C. under a laboratory hood. The distillate was collected in a brown bottle sealed to the condenser tube, which also contained nitrogen.

One volume of the 1.5% cell suspension was added to two volumes of each of the following reagent: the 2% prepared glutaraldehyde (aged three months), the 2% freshly prepared glutaraldehyde, the 4.5% acrolein as prepared above, and a 4.5% acrolein prepared as above using undistilled acrolein. The mixtures were then stored at 4° C. for 44 hours with occasional shaking to promote the reaction of the acrolein and the glutaraldehyde with the microbial cells. A test made at the end of 40 hours storage with Schiff's reagent (fuchsin decolorized by sulfurous acid) showed all treated cells to have reactive aldehyde groups on the surfaces thereof.

Yeast cells were preserved with the glutaraldehyde and acrolein solutions in a manner similar to that above set out. Two 1 gram portions of Fleishman's "Active Dry" brewers yeast obtained from Standard Brands, Inc., New York (*Saccharomyces cerevisiae*) were treated in the following manner. The 1 gram portions were each washed three times with saline, resuspended in 200 ml. of saline and then 400 ml. of the above 2% glutaraldehyde solution was added to one of the portions and 200 ml. of the above 4.5% acrolein solution was added to the other portion. The preparations were then stored at 22° C. for 40 hours to allow for the preservation reaction to occur. When tested with Schiff's reagent in the above manner the cells of both portions were found to have reactive aldehyde groups on the surfaces thereof.

Preparation of final reagent

The coupling of HCG (4 mg./ml.) and horse globulin (200 AU/ml. diphtheria antitoxin) to each of these reactive particles was conducted by washing the particles three times with saline. In the case of HCG an additional wash is carried out with pH 7.3 saline phosphate buffer (SPB) and in the case of horse globulin the additional wash is with pH 9.5 SPB. Each of the particles were then diluted to 10% suspension in their corresponding buffers, and to ten volumes thereof five volumes of HCG or one volume of horse globulin were added, respectively. These mixtures were shaken at 22° C. for 16 hours and at 37° C. for about 100 minutes to form the indicator particles for each of the antigens. They were then washed twice with physiological saline and once with 0.6% bovine serum albumin (BSA) in saline and resuspended in the BSA to a suspension having a 2% particle concentration. Eight batches of indicator particles were prepared in this manner, four with HCG and four with horse globulin.

Antibody solutions for these indicator particles were then prepared by diluting one volume of each of rabbit anti-HCG serum and rabbit anti-horse globulin serum with ten volumes of physiological saline. The control for these preparations was a 1:10 dilution of normal rabbit serum in physiological saline.

Testing of reagent

The prepared indicator particles were then tested with the above antibody solutions using the above described micro-titrator agglutination technique according to the following procedure wherein the enumerated additions were made to each of a row of twelve wells:
(1) one drop of 0.6% BSA in saline as a diluent
(2) one loop of the respective anti-serum dilutions carried over into eleven subsequent wells
(3) one drop of the corresponding 2% indicator particle suspension. The loop dilution technique resulted in final anti-serum dilutions after step (3) ranging from 1:40 to 1:81920 for the twelve wells in the row.

In each series of wells containing the specific antisera, positive agglutination patterns formed up to the midportion of the titration range. Thus, by observing the titre of the last positive pattern a quantitative measure of the antibody concentration was effected.

According to a similar design, slide agglutination testing was done with 1:20 dilutions of the sera and the specificity of the anti-sera was qualitatively identified.

The conclusion based on the agglutination patterns formed was that the immunological materials HCG and horse globulin had been successfully coupled to each of the reactive particles.

EXAMPLE II

Red blood cells were treated with glutaraldehyde and acrolein to form reactive particles. These particles were then reacted with a human blood group antigen of a human gamma globulin in order to form indicator particles for detecting their respective antibodies (immunological counterparts).

Preparation of the reactive particles

A quantity of goat blood was collected and mixed with an equal quantity of Alsever's solution. The mixture showed a hematocrit cell suspension of 18.5%. The blood mixture was then washed 4 times with sterile 0.85% saline solution and 16 ml. of a 10% suspension in physiological saline prepared.

A 50% glutaraldehyde solution was adjusted to pH 6 with NaOH and then diluted to a 2% solution by mixing 40 ml. with 960 ml. of a 1 to 10 dilution of phosphate buffered saline solution (pH 7.2) in distilled water. Three (3) ml. of the above cell suspension was mixed with 6 ml. of this 2% glutaraldehyde solution and placed on a rotary shaker for 2 hours. The mixture was then removed from the shaker and incubated overnight at room temperature (25° C.). The treated cells were washed four times in saline solution and resuspended to a 10% saline suspension under sterile conditions.

An 8% undistilled acrolein solution was made by adding 8 g. (9.3 ml.) of acrolein to 10 ml. of phosphate buffered saline (pH 7.2) and then diluting with distilled water to a volume of 100 ml. After several days standing the solution showed some cloudiness and was centrifuged at 10,000 r.p.m. for 30 minutes. A 4% solution of acrolein was made up by diluting the 8% solution with an equal volume of 1.115% saline solution. Three (3) ml. of the above cell suspension were then mixed with 6 ml. of this 4% acrolein solution, the mixture shaken, and incubated in the same manner as set out for the glutaraldehyde treatment. The treated cells were washed four times in saline solution and resuspended to a 10% saline suspension under sterile conditions.

Preparation of human "A" blood group indicator particles

These two reactive particles were then used to prepare indicator particles for detecting anti-human "A" specific blood group substance and anti-human gamma globulin recovered from a rabbit. The indicator particles for detecting the first of these immunological materials are prepared by coupling a human "A" blood group specific substance to each of the glutaraldehyde and the acrolein treated reactive indicator particles. The indicator particles for detecting the rabbit anti-human gamma globulin were prepared by coupling human gamma globulin to each of the glutaraldehyde and the acrolein treated reactive particles.

Two (2) ml. of 10% cell suspensions of both of the above reactive particles were prepared by washing once and then resuspending in pH 9.5 saline phosphate buffer. Each 2 ml. portion was then divided equally and used for coupling as follows: to the first of the 1 ml. portions of the glutaraldehyde treated cells 0.5 ml. of a human "A" blood group specific substance was added, and to the second 1 ml. portion 0.1 ml. of a mixture of 1 part of human gamma globulin in 10 parts of physiological saline was added. The same additions were made to the two 1 ml. portions of the acrolein treated cells. The mixtures were then shaken at room temperature for about 17 hours in order to provide sufficient time for the coupling reaction to occur. A suitable human "A" blood group substance can be obtained from Chas. Pfizer & Co., Brooklyin, N.Y., under the trade designation "Substance A."

The four indicator particle batches were then equally divided into four paired batches. The first of each pair was subjected to a temperature of 37° C. for 2 hours without shaking, and the second of each pair was allowed to remain at room temperature during the same period without shaking. Each batch of cells was then washed three times with pH 7.0 saline solution and then resuspended to 0.5% cells concentration in a 0.6% solution of bovine serum albumin in 0.85% physiological saline solution (abbreviated BSA 0.6%). These series of indicator systems were then used to carry out micro-titrator agglutination testing in the manner set out above. The titres of the antibodies added range from 1:10 to 1:1280 for a series of eight rows each row having eight wells per row.

The antibody preparations for use with the "A'" blood group indicator particles consisted of commercially available processed human serum containing antibody to blood group "A." The antibody preparations for use with the human gamma globulin indicator particles consisted of rabbit serum containing anti-human gamma globulin.

A micro-titrator procedure as described in Example I was carried out together with proper controls.

In each of the eight rows agglutinated patterns appeared at the lower dilutions of about 1:10 to 1:80 and non-agglutinated patterns appeared in the wells containing the highest dilutions, as expected, since the antibody concentration at these dilutions were insufficient to allow an agglutination reaction. As known from prior investigations this testing then permits the conclusion that agglutination testing for the presence of blood group isoagglutinins (antibodies) as well as of anti-human gamma globulin in test samples is possible with those indicator particles. Also the corresponding antigens can be tested for by an inhibition of agglutination test procedure.

EXAMPLE III

Reactive particles of red blood cells having acrolein molecules attached to the surfaces thereof were made up and individually coupled to the following group of biological materials: bovine gamma globulin (BG), human gamma globulin (HG), diphtheria antitoxin (equine globulin), and tetanus antitoxin (equine globulin). The resulting indicator particles were lyophilized to a dry form, stored, and reconstituted with liquid, and immunological tests were then performed therewith.

Goat red blood cells were collected and treated with acrolein in the manner set out in Example II. The treated cells were stored at 4° C. under a nitrogen atmosphere and thereafter coupled with antigenic materials according to the following procedure:

Five (5) ml. of the 10% suspension of the reactive particles were placed in each of 5 test tubes, washed once with 8 ml. of 0.85% saline solution, centrifuged for 5 minutes at 5000 r.p.m. and then resuspended in 4 ml. of the same saline solution. Five tenths (0.5) ml. of the following antigen preparations diluted in 0.85% saline were then added, one each to one of the tubes: 1% BG, 1% HG, diphtheria antitoxin (200 AU/ml., 2% globulin), and tetanus antitoxin (200 AU/ml.). These preparations were allowed to react for about a week at room temperature and then 0.2 ml. of each was removed, and each except the BG indicator washed three times with 4.0 ml. of BSA 0.6%. The BG preparation was washed with a 0.6% solution of normal rabbit serum proteins in physiological saline. These washed indicator particles were then resuspended to 1% concentration in the BSA 0.6% and normal rabbit serum, respectively, and used for micro-titrator agglutination testing. These tests were carried out by using serial dilutions in the above diluents of the following antibodies: anti-bovine gamma globulin derived from a rabbit, anti-human gamma globulin derived from a rabbit, anti-equine gamma globulin derived from a rabbit and diphtheria and tetanus toxoid. Agglutination patterns appeared out to the fourth well in each of the rows of wells and from the fifth well on nonagglutinated patterns appeared when the immunological counterpart was reacted. Other materials resulted in negative patterns. Thus the indicator particles had been adequately coupled by the simple room temperature mixing of the antigen preparations with the reactive particles.

Two and one half (2.5) ml. of the indicator particles thus prepared and tested were made up as a 10% suspension, centrifuged three times at 5000 r.p.m. for five minutes per time, and resuspended to 10% concentration. The wash and resuspending diluent for each but the BG indicator was BSA 6%. The diluent for the BG indicator was 6% normal rabbit serum in 0.85% saline solution. The final volumes of each of the 2.5 ml. volumes per indicator system were equally divided into vials, resulting in a 5 mm. deep fluid content, and the preparations were frozen for 5 minutes in a Dry Ice acetone bath. These preparations were then placed in a laboratory lyophilizer and freeze dried for 48 hours, after which treatment the vials were capped and stored at 4° C.

The indicator particles were thereafter resuspended to 1% concentration in physiological saline and tested by a micro-titrator agglutination technique against serial dilutions of their respective antibodies or antigens using the procedures of Example I.

The micro-titrator plate showed agglutination in the same manner as before lyophilization, thus indicating that the lyophilization procedure did not destroy the reactivity of the indicator particles. The ability of the diphtheria and tetanus antitoxin indicator particles to be agglutinated by the corresponding antigen indicates that the coupling procedure does not destroy the antibody properties.

The horse diphtheria antitoxin can also be considered as an antigen, namely horse gamma globulin. The success of coupling was proven by agglutinating these indicator particles with antibody prepared in the rabbit against normal horse gamma globulin.

A further series of tests were then carried out using the lyophilized diphtheria antitoxin particles to test for the presence of the so-called rheumatoid arthritis factor (RF) in human sera since it has been described in the literature that most patients having rheumatoid arthritis harbor RF in their sera. This factor acts like antibody against a variety of animal gamma globulins and among them the horse gamma globulin. When the diphtheria antitoxin indicator particles of the present invention were tested by a micro-titrator procedure sera from rheumatoid arthritis patients gave agglutination.

Thus the indicator particles of this invention made with the reactive particles disclosed can be prepared, lyophilized, reconstituted, and used for testing patient sera.

In summary, reactive particles are formed by reacting alpha, beta-unsaturated aldehydes and dialdehydes with carrier particles in order to create aldehyde reactive moieties on the surfaces thereof. These reactive particles can then be directly coupled to biological materials to form reagents which can be used for many purposes, particularly to carry out immunological testing by agglutination procedures.

What is claimed is:

1. A particle useful for immunological testing comprising discrete cells of uniform shape and size selected from the group consisting of red blood cells and bacterial cells and an aliphatic, unsaturated, monoaldehyde selected from the group consisting of acrolein, crotonaldehyde and methacrolein covalently bound to the surface of said cells.

2. A particle as in claim 1 comprising *Escherichia coli* and acrolein.

3. A particle as in claim 1 comprising red blood cells and acrolein.

4. A method of making a particle useful for immunological testing which comprises intimately contacting discrete cells of uniform shape and size selected from the group consisting of red blood cells and bacterial cells with an aliphatic, unsaturated, monoaldehyde selected from the group consisting of acrolein, crotonaldehyde and methacrolein in an aqueous medium for at least 16 hours at a temperature of from 20° C. to 25° C.

5. A method as in claim 4 wherein *Escherichia coli* is intimately contacted with acrolein in water for 16 hours at 25° C.

6. A method as in claim 4 wherein red blood cells are intimately contacted with acrolein in water for 16 hours at 25° C.

References Cited

UNITED STATES PATENTS 3,234,096   2/1966   Pollack _____ 424—12

OTHER REFERENCES

N.R. Ling, Brit. J. Haematology, vol. 7, pp. 299–302, 1961.

N. R. Ling, The J. of Medical Laboratory Technology, pp. 94–101, November 1960.

ALBERT T. MEYERS, Primary Examiner

D. J. FUNDERBURK, Assistant Examiner

U.S. Cl. X.R.

424—7, 8, 11, 12